(12) United States Patent
Gadkaree et al.

(10) Patent No.: US 12,053,735 B2
(45) Date of Patent: *Aug. 6, 2024

(54) SORBENT STRUCTURES WITH RESISTIVE HEATING CAPABILITY AND METHODS OF MAKING THE SAME

(71) Applicant: CORNING INCORPORATED, Corning, NY (US)

(72) Inventors: Kishor Purushottam Gadkaree, Painted Post, NY (US); Mallanagouda Dyamanagouda Patil, Corning, NY (US); Kim Doreen Pierotti, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/196,576

(22) Filed: May 12, 2023

(65) Prior Publication Data

US 2023/0277975 A1    Sep. 7, 2023

Related U.S. Application Data

(63) Continuation of application No. 16/343,862, filed as application No. PCT/US2017/057667 on Oct. 20, 2017, now Pat. No. 11,679,354.
(Continued)

(51) Int. Cl.
*B01J 20/20* (2006.01)
*B01D 53/02* (2006.01)
(Continued)

(52) U.S. Cl.
CPC ............ *B01D 53/04* (2013.01); *B01D 53/02* (2013.01); *B01D 53/62* (2013.01); *B01D 53/82* (2013.01);
(Continued)

(58) Field of Classification Search
CPC ...................................................... B01J 20/20
See application file for complete search history.

(56) References Cited

U.S. PATENT DOCUMENTS 4,968,329 A    11/1990  Keefer
5,750,026 A     5/1998  Gadkaree et al.
(Continued)

FOREIGN PATENT DOCUMENTS

CA    2016045 A1   11/1991
CN   101653721 A    2/2010
(Continued)

OTHER PUBLICATIONS

Van et al; "CO2 Capture by Electrothermal Swing Adsorption With Activated Carbon Fibre Materials" International Journal of Greenhouse Gas Control, 5 (1), pp. 16-25 (2011).
(Continued)

*Primary Examiner* — Stuart L Hendrickson
(74) *Attorney, Agent, or Firm* — Daniel J. Greenhalgh

(57) ABSTRACT

A sorbent structure that includes a continuous body in the form of a flow-through substrate comprised of at least one cell defined by at least one porous wall. The continuous body comprises a sorbent material carbon substantially dispersed within the body. Further, the temperature of the sorbent structure can be controlled by conduction of an electrical current through the body.

20 Claims, 7 Drawing Sheets

Related U.S. Application Data

(60) Provisional application No. 62/410,934, filed on Oct. 21, 2016.

(51) Int. Cl.

| | | |
|---|---|---|
| *B01D 53/04* | (2006.01) | |
| *B01D 53/62* | (2006.01) | |
| *B01D 53/82* | (2006.01) | |
| *B01J 20/18* | (2006.01) | |
| *B01J 20/22* | (2006.01) | |
| *B01J 20/28* | (2006.01) | |
| *B01J 20/30* | (2006.01) | |
| *B01J 20/32* | (2006.01) | |
| *B01J 20/34* | (2006.01) | |

(52) U.S. Cl.
CPC ............ *B01J 20/183* (2013.01); *B01J 20/20* (2013.01); *B01J 20/223* (2013.01); *B01J 20/226* (2013.01); *B01J 20/28045* (2013.01); *B01J 20/28059* (2013.01); *B01J 20/28061* (2013.01); *B01J 20/28064* (2013.01); *B01J 20/3007* (2013.01); *B01J 20/3078* (2013.01); *B01J 20/3204* (2013.01); *B01J 20/3238* (2013.01); *B01J 20/3265* (2013.01); *B01J 20/3441* (2013.01); *B01D 2253/102* (2013.01); *B01D 2253/108* (2013.01); *B01D 2253/204* (2013.01); *B01D 2253/25* (2013.01); *B01D 2253/306* (2013.01); *B01D 2253/3425* (2013.01); *B01D 2257/504* (2013.01); *B01D 2259/40096* (2013.01); *B01J 2220/42* (2013.01); *Y02C 20/40* (2020.08)

(56) References Cited

U.S. PATENT DOCUMENTS

| | | | |
|---|---|---|---|
| 5,912,424 | A | 6/1999 | Judkins et al. |
| 5,972,077 | A | 10/1999 | Judkins et al. |
| 5,993,517 | A | 11/1999 | Chen et al. |
| 6,045,603 | A | 4/2000 | Chen et al. |
| 6,066,192 | A | 5/2000 | Toshinaga et al. |
| 6,097,011 | A | 8/2000 | Gadkaree et al. |
| 6,200,483 | B1 | 3/2001 | Cutler et al. |
| 6,692,626 | B2 | 2/2004 | Keefer et al. |
| 7,077,891 | B2 | 7/2006 | Jaffe et al. |
| 7,141,092 | B1 | 11/2006 | Roychoudhury et al. |
| 7,946,258 | B2 | 5/2011 | Adams |
| 8,052,783 | B2 | 11/2011 | Baker |
| 8,080,095 | B2 | 12/2011 | Rood et al. |
| 8,080,209 | B2 | 12/2011 | Shirono et al. |
| 8,470,395 | B2 | 6/2013 | Khiavi et al. |
| 8,496,734 | B2 | 7/2013 | Gadkaree et al. |
| 8,809,230 | B2 | 8/2014 | Worsley et al. |
| 8,900,347 | B2 | 12/2014 | Boulet et al. |
| 9,216,374 | B2 | 12/2015 | Fujimine et al. |
| 11,679,354 | B2 * | 6/2023 | Gadkaree .............. B01J 20/20 423/230 |
| 2005/0121393 | A1 | 6/2005 | Galbraith |
| 2005/0129952 | A1 | 6/2005 | Sawada et al. |
| 2007/0249493 | A1 | 10/2007 | Kawata et al. |
| 2008/0131360 | A1 | 6/2008 | Adams |
| 2008/0131744 | A1 | 6/2008 | Adams |
| 2008/0138676 | A1 | 6/2008 | Adams |
| 2009/0007779 | A1 | 1/2009 | Coignet et al. |
| 2009/0035619 | A1 | 2/2009 | Adams |
| 2010/0212495 | A1 | 8/2010 | Gadkaree et al. |
| 2011/0268618 | A1 | 11/2011 | Finkenrath |
| 2012/0300359 | A1 | 11/2012 | Yamashita et al. |
| 2013/0137567 | A1 | 5/2013 | Stasko |
| 2013/0152787 | A1 | 6/2013 | Boulet et al. |
| 2014/0271394 | A1 | 9/2014 | Jiang et al. |

FOREIGN PATENT DOCUMENTS

| | | |
|---|---|---|
| CN | 101948707 A | 1/2011 |
| CN | 102365123 A | 2/2012 |
| CN | 102821827 A | 12/2012 |
| CN | 103087793 A | 5/2013 |
| CN | 203469762 U | 3/2014 |
| CN | 104540584 A | 4/2015 |
| FR | 2891160 A1 | 3/2007 |
| JP | 49-115110 A | 11/1974 |
| JP | 2011-206749 A | 10/2011 |
| JP | 2013-010090 A | 1/2013 |
| JP | 2014-000531 A | 1/2014 |
| KR | 2005-0063253 A | 6/2005 |
| KR | 10-0591271 B1 | 6/2006 |
| KR | 10-0990134 B1 | 10/2010 |
| KR | 10-1308405 B1 | 9/2013 |
| WO | 2009/061533 A1 | 5/2009 |
| WO | 2015/054332 A1 | 4/2015 |

OTHER PUBLICATIONS

Chinese Patent Application No. 201780065360.1, Office Action dated Sep. 27, 2021, 13 pages English Translation Only, Chinese Patent Office.

Garcia et al; "How to Optimize the Electrostatic Interaction Between a Solid Adsorbent and CO2"; Journal of Physical Chemistry C, 118 (18), pp. 9458-9467 (2014).

Grande et al; "Electric Swing Adsorption for CO2 Removal From Flue Gases"; International Jounral of Greenhouse Gas Control, 2 (2), pp. 194-202 (2008).

International Search Report and Written Opinion of the International Searching Authority; PCT/US2017/057667; Mailed Feb. 7, 2018; 18 Pages; European Patent Office.

Ribeiro et al; "Activated Carbon Honeycomb Monolith -Zeolite 13X Hybrid System to Capture CO2 From Flue Gases Employing Electric Swing Adsorption" Chemical Engineering Science, 104, pp. 304-318 (2013).

* cited by examiner

SORBENT STRUCTURES WITH RESISTIVE HEATING CAPABILITY AND METHODS OF MAKING THE SAME

CROSS-REFERENCE TO RELATED APPLICATION

This application is a continuation of U.S. application Ser. No. 16/343,862, filed on Apr. 22, 2019, which is a National Stage application under 35 U.S.C. § 371 of International Application No. PCT/US17/57667, filed on Oct. 20, 2017, which claims the benefit of priority of U.S. Provisional Application Ser. No. 62/410,934 filed on Oct. 21, 2016, the contents of which are relied upon and incorporated herein by reference in their entirety.

FIELD OF THE DISCLOSURE

The present disclosure relates generally to a sorbent structure with an electrically resistive heating capability that is useful in the removal of carbon dioxide and other compounds, along with a method of making the structure.

BACKGROUND

The concerns related to global warming are well-documented, and are generally associated with carbon dioxide ($CO_2$) levels in the atmosphere associated with human activity. Power plants are thought to contribute about one third of all $CO_2$ related to human activity. Other industries, such as oil refinement, steel and other metal alloy fabrication, and cement processing, also produce and release large quantities of $CO_2$, along with other undesirable compounds (e.g., fluorocarbons), into the environment on a yearly basis. These $CO_2$ levels and levels of other compounds detrimental to the environment can be substantially reduced by capturing and storing $CO_2$ and these other compounds without a significant impact to the processes and methods employed by these industries. Methods and design approaches associated with removing and storing $CO_2$ and other gases have been developed and are used today to capture undesirable $CO_2$ and other by-products from various industrial processes. Further, the $CO_2$ can be securely stored in various underground reservoirs and containment vessels for hundreds and even thousands of years.

Among the various approaches employed to capture and store $CO_2$ gas, and other gaseous products that are detrimental to the environment, certain sorbent material technologies can be employed to adsorb $CO_2$ gas and other gases contained in exhaust gas flows from processes employed by the oil refining, steel and metal alloy fabrication and cement processing industries, among others. After the $CO_2$ gas is adsorbed, for example, additional steps are necessary to desorb the $CO_2$ into containment vessels or other suitable reservoirs for sequestration or other down-stream uses. Significant amounts of energy are typically required to fabricate these sorbent materials, as many of them are processed at extremely high temperatures (e.g., above 800° C.) to develop the necessary surface area and chemistries required to effect $CO_2$ gas capture and storage, along with other detrimental gases. Further, significant amounts of energy are employed in the adsorption and desorption processes to capture and store these gases. For example, adsorption and desorption of $CO_2$ gas are highly temperature-dependent and it can be exceedingly difficult to efficiently heat and cool the sorbent materials with conventional approaches (e.g., by convection- and radiation-related heat transfer within a furnace).

Accordingly, there is a need for sorbent structures and configurations that can efficiently capture and store $CO_2$ and other detrimental by-products from various industrial processes with limited energy usage. There is also a need for sorbent structure designs that can be fabricated in a cost-effective manner with limited energy usage.

SUMMARY

A first aspect of the disclosure pertains to a sorbent structure that includes a continuous body in the form of a flow-through substrate comprised of at least one cell defined by at least one porous wall. The continuous body comprises a sorbent material and from about 5% to about 35% carbon by weight, the carbon substantially dispersed within the body. Further, the temperature of the sorbent structure can be controlled by conduction of an electrical current through the body. In some implementations, the electrical resistance of the body is about 5 ohms to about 15 ohms.

In certain implementations of the first aspect, the carbon in the continuous body is an activated carbon. The carbon in the continuous body can also be a non-activated carbon. The continuous body can also include a carbon black in some embodiments. According to a further embodiment, the carbon in the continuous body can be derived from a synthetic carbon precursor, organic carbon precursor or a combination of these precursors.

In other implementations of the first aspect, the continuous body can comprise a carbon black. The continuous body can also be derived from a green body that comprises a phenolic resin, a methylcellulose, a plasticizer, an inorganic filler and the sorbent material.

According to other implementations of the first aspect, the sorbent structure has a specific surface area from about 400 $m^2/g$ to about 600 $m^2/g$ as measured by a Brunauer-Emmett-Teller (BET) adsorption method. Other implementations are such that the sorbent structure has a specific surface area from about 100 $m^2/g$ to about 200 $m^2/g$ as measured by a BET adsorption method.

A second aspect of the disclosure pertains to a sorbent structure that includes a continuous body in the form of a flow-through substrate comprising a non-activated carbon and at least one cell defined by at least one porous wall. The body further comprises a sorbent coating comprising a sorbent material. In some cases, the sorbent coating is located on the porous wall or walls of the body; or, alternatively, within the body. Further, the temperature of the sorbent structure can be controlled by conduction of an electrical current through the body. In some implementations of the second aspect, the electrical resistance of the body is about 5 ohms to about 15 ohms.

In certain implementations of the second aspect, the sorbent coating is derived from a green coating that comprises a methylcellulose, a plasticizer, an inorganic filler and the sorbent material.

According to other implementations of the second aspect, the sorbent structure has a specific surface area from about 400 $m^2/g$ to about 600 $m^2/g$ as measured by a Brunauer-Emmett-Teller (BET) adsorption method. Other implementations are such that the sorbent structure has a specific surface area from about 100 $m^2/g$ to about 200 $m^2/g$ as measured by a BET adsorption method.

A third aspect of the disclosure pertains to a method of making a sorbent structure that includes: forming a mixture of a carbon precursor and a sorbent material into the shape of a flow-through substrate; drying the mixture; and carbonizing the carbon precursor in the mixture to define a continuous body in the form of the flow-through substrate comprised of at least one cell defined by at least one porous wall. The body comprises a sorbent material and about 5% to about 35% carbon by weight, the carbon substantially dispersed within the body. Further, the temperature of the sorbent structure can be controlled by conduction of an electrical current through the body.

In certain implementations of the method, the body comprises from about 10% to about 25% carbon by weight. Further, in certain embodiments of the method, the forming and carbonizing steps are conducted such that the sorbent material is continuous within the body.

In other implementations of the method of the third aspect, the forming step comprises extruding the mixture into a green body of the shape of a flow-through substrate, the green body comprises a phenolic resin, a methylcellulose, a plasticizer, an inorganic filler and the sorbent material.

A fourth aspect of the disclosure pertains to a method of making a sorbent structure that includes: forming a carbon precursor into the shape of a flow-through substrate; carbonizing the carbon precursor to form a continuous, non-activated carbon body in the form of a flow-through substrate comprised of at least one cell defined by at least one porous wall; applying a sorbent coating comprising a sorbent material into the substrate; and firing the coating within the substrate. Further, the temperature of the sorbent structure can be controlled by conduction of an electrical current through the body. Further, the applying step can comprise wash-coating the sorbent coating into the substrate.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure as it is claimed.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following aspects.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Figure 1:
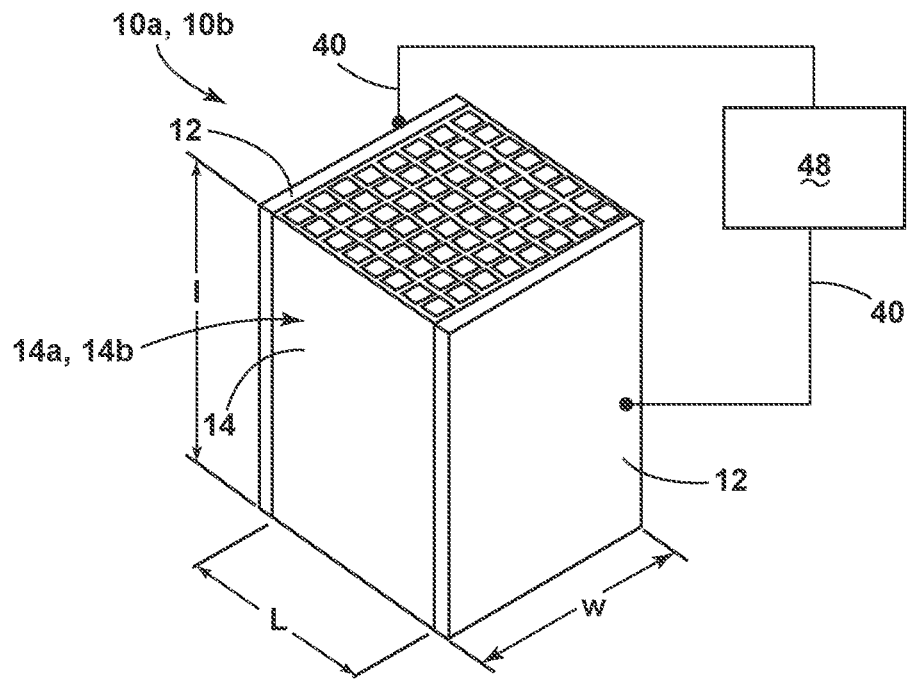
FIG. 1 is a perspective, schematic view of a $CO_2$ removal and regeneration system with a sorbent structure according to an aspect of the disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Aspects of the disclosure generally relate to sorbent structures and systems for capture and storage of $CO_2$ gases, along with other detrimental gases. These sorbent structures can be situated in exhaust streams of various industrial processes to capture and store $CO_2$ gases. In embodiments, sorbent structures of the present disclosure may be utilized to capture $CO_2$ directly from atmospheric gas (i.e., air). Typically, the $CO_2$ gases can be adsorbed within the sorbent structures at ambient temperatures or higher temperatures associated with the exhaust streams of the industrial process subject to $CO_2$ capture from the sorbent structure. As $CO_2$ gas is collected within the sorbent structure through adsorption, pressure will build in the structure and, eventually, $CO_2$ levels will saturate within the sorbent structure to final loading level.

Storage of the adsorbed $CO_2$ gas can be accomplished through a desorption process (also referred herein as "regeneration"). Desorption of $CO_2$ gas from a sorbent structure generally requires the addition of thermal energy to the sorbent structure. Accordingly, a thermal swing adsorption ("TSA") process can be employed in such systems to capture and store $CO_2$ gas. Typically, TSA processes involve the use of a lower temperature for the adsorption stage of the process and a higher temperature for the desorption stage of the process.

Conventional approaches to the desorption stage of the TSA process involve heating of the sorbent structure by a furnace positioned to surround the sorbent structure. While these approaches can be effective at heating the sorbent structure to release $CO_2$ gas for purposes of regeneration, they require significant energy usage. A key drawback of this system and the TSA process is that a significant portion of the thermal energy from the furnace is lost to the environment, as they generally rely on radiative and convection to transfer the thermal energy to the sorbent structure.

Aspects of the disclosure, in contrast, generally pertain to sorbent structures and systems that can accomplish the desorption stage of the TSA process through significantly more efficient thermal energy usage. In particular, these aspects are directed to sorbent structures that can be heated by passing a sufficient voltage across a portion of the sorbent structures to resistively heat the sorbent structures to promote $CO_2$ gas desorption, according to processes referred herein as "electric swing adsorption" ("ESA"). By directly heating the sorbent structure through the generation of heat by the application of voltage, the ESA-driven sorbent structures can more efficiently utilize thermal energy in comparison to conventional sorbent structures and systems. More particularly, the electrical energy is converted to thermal energy directly within the sorbent structure via resistive heating. This thermal energy can then break the sorbent—$CO_2$ bonds, thus ensuring desorption of the $CO_2$ gas.

Another advantage of the sorbent structures of the disclosure is that they can be processed and fabricated at relatively low temperatures. For example, embodiments of the sorbent structures of the disclosure include carbon in a non-activated form; consequently, these sorbent structures do not have to be processed at the high temperatures necessary to produce activated carbon. The net effect is that these sorbent structures require lower manufacturing costs in comparison to other conventional sorbent structures that require processing at temperatures indicative of carbon activation.

Figure 1A:
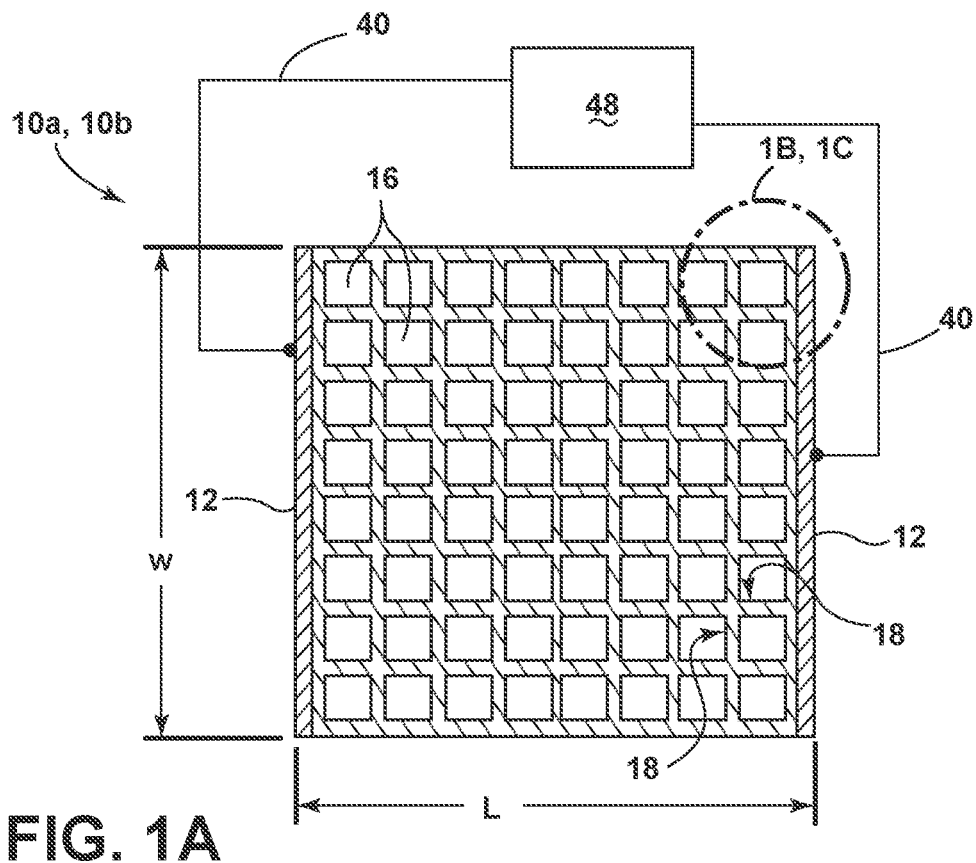
FIG. 1A is a top-down, plan view of the system and sorbent structure depicted in FIG. 1.
Figure 1B:
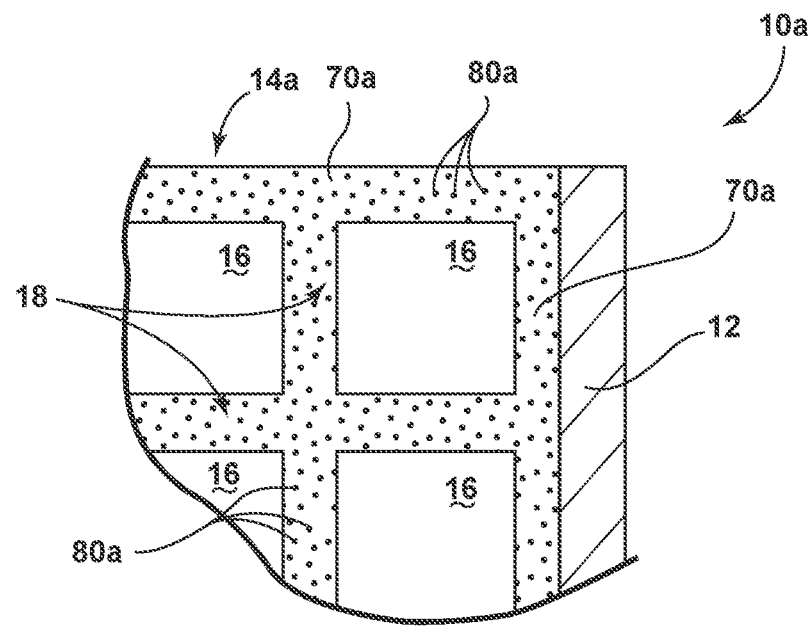
FIG. 1B is an enlarged, top-down, schematic view of a first embodiment of the sorbent structure depicted in FIG. 1.

Referring to FIGS. 1, 1A and 1B, a sorbent structure 10a is depicted in schematic form within a $CO_2$ gas adsorption and regeneration system. The sorbent structure 10a includes a continuous body 14a in the form of a flow-through substrate 14. As depicted in FIG. 1, the flow-through substrate 14 can be defined by a length, l, width, w, and a distance, L, between two sides 12. Further, the flow-through substrate 14 includes one or more cells 16 that are defined by one or more porous walls 18 (see FIG. 1A). In addition, the continuous body 14a includes a sorbent material 70a (see FIG. 1B) and carbon 80a that is substantially dispersed within the body 14a.

As also shown in FIGS. 1, 1A and 1B, the temperature of the sorbent structure 10a can be controlled by conduction of an electrical current and the resistance associated with its conduction. In certain implementations, sides 12 of the sorbent structure 10a are conductive, and connected to leads 40. Further, these leads 40 are connected to an electrical power supply 48. Various approaches can be employed to control the voltage of the power supply 48 in a time-dependent manner to effect temperature control of the sorbent structure 10a (along with the sorbent structure 10b depicted in FIG. 1C, described later) through resistive heating via passage of electrical current through the leads 40 and the sides 12 of the flow-through substrate 14. Depending on the arrangement of the sorbent structure 10a, sides 12, leads 40, power supply 48, and other factors, the electrical resistance of the sorbent structure 10a and its continuous body 14a can be from about 5 to about 500 ohms, about 5 to about 50 ohms, about 5 to about 15 ohms, and all resistance values between these ranges.

As used herein in connection with the flow-through substrate 14 depicted in FIG. 1, the term "flow-through substrate" is a shaped body comprising inner passageways, such as straight or serpentine channels and/or porous networks that would permit the flow of a fluid stream through the body, e.g., continuous body 14a in FIG. 1B (or the continuous body 14b in FIG. 1C, as described later in the disclosure). Further, the flow-through substrate 14 can comprise a dimension in the flow-through direction of at least 1 cm, at least 2 cm, at least 3 cm, at least 4 cm, at least 5 cm, at least 6 cm, at least 7 cm, at least 8 cm, at least 9 cm, at least 10 cm, or from 1 cm to 1 m, from the inlet end to the outlet end.

As used herein, the term "adsorption" refers to the adsorption, absorption, or other entrapment of $CO_2$ gas on the flow-through substrate 14, either physically, chemically, both physically and chemically, or both some other mechanism alone or in combination with physical and/or chemical mechanisms.

In some aspects of the disclosure, the flow-through substrate 14 has a honeycomb structure comprising an inlet end, an outlet end, and inner channels extending from the inlet end to the outlet end. In one embodiment, the honeycomb comprises a multiplicity of cells extending from the inlet end to the outlet end, the cells being defined by intersecting cell walls, e.g., cell walls 18. The honeycomb substrate could optionally comprise one or more selectively plugged honeycomb substrate cell ends to provide a wall flow-through structure that allows for more intimate contact between the fluid stream (e.g., the exhaust stream that includes $CO_2$ gas) and cell walls.

In an embodiment of the disclosure, the flow-through substrate 14, as depicted in exemplary form in FIG. 1, includes a surface having a surface area of 100 m$^2$/g or more, 200 m$^2$/g or more, 300 m$^2$/g or more, 400 m$^2$/g or more, or 500 m$^2$/g or more.

In another embodiment of the disclosure, the flow-through substrate 14 is characterized by a total pore volume such that at least 40% of the total pore volume is comprised of pores having a pore diameter of 5 nanometers or more. In another embodiment, the flow-through substrate 14 includes a total pore volume such that from about 20% to about 70% of the total pore volume is comprised of pores having a pore diameter in the range of 5 nanometers to 20 microns. In another embodiment, the flow-through substrate 14 includes a total pore volume such that from about 20% to about 70% of the total pore volume is comprised of pores having a pore diameter in the range of 2 microns to 50 microns. The pores of the flow-through substrate 14 may create "interconnecting porosity," defined herein as being characterized by pores which connect into and/or intersect other pores to create a tortuous network of porosity within the substrate 14.

Further, the flow-through substrate 14 can be characterized by a surface area available for contact and adsorption of $CO_2$ gas. In general, as the cell density of the flow-through substrate 14 increases, the surface area available for contact with $CO_2$ gas also increases. In another embodiment, the flow-through substrate 14 can be characterized by a cell density ranging from about 6 cells per square inch ("cpsi") to about 1200 cpsi. In another implementation, the cell density of the flow-through substrate 14 can range from about 50 cpsi to about 900 cpsi. Further, certain implementations of the flow-through substrate 14 can be characterized by a cell density from about 100 cpsi to about 600 cpsi.

According to another aspect, the flow-through substrate 14, as depicted in exemplary form in FIG. 1, can be characterized with at least one cell wall 18 having a thickness that ranges from about 0.001 inches to about 0.050 inches. Other embodiments of the flow-through substrate 14 can be characterized with at least one cell wall 18 having a thickness that ranges from about 0.002 inches to about 0.040 inches. More generally, increases to cell density and wall thickness of the flow-through substrate 14 result in higher bulk density levels and adsorbent capacity. In embodiments, flow-through substrate 14 includes a geometric surface area from about 10 to about 60 squared centimeters per cubic centimeter (cm$^2$/cm$^3$) of substrate, or about 20 cm$^2$/cm$^3$ to about 50 cm$^2$/cm$^3$, or even from about 20 cm$^2$/cm$^3$ to about 30 cm$^2$/cm$^3$.

As used herein in connection with the sorbent structure 10a and the continuous body 14a, the term "continuous body" refers to a continuous uninterrupted structure of sorbent material 70a and substantially dispersed carbon 80a within the structure. Accordingly, a "continuous body" can be in the form of a network, skeleton or other interconnected structure in which the sorbent material 70a is in contact throughout the structure 10a. Further, the carbon 80a is substantially dispersed throughout or otherwise on the structure 10a. As used herein in connection with the carbon 80a of the continuous body 14a, the term "substantially dispersed" refers to a distribution of carbon 80a within the bulk and/or surfaces of the continuous body 14a that results in a conduction path such that an electrical resistance measured between opposed sides of the sorbent structure (e.g., opposed sides 12 of the sorbent structure 10a) is less than or equal to about 500 ohms. As a non-limiting example, the carbon 80a can be substantially dispersed within the continuous body 14a such that the carbon 80a and the continuous body 14a are both in the form of a network, skeleton or other interconnected structure. As is also outlined in the disclosure, the continuous body 14a can include other non-carbon constituents (e.g., inorganic fillers) in addition to the sorbent material, which may or may not be in continuous, uninterrupted contact with one another.

An advantage of the sorbent structure 10a with a continuous body 14a that includes a continuous uninterrupted structure of sorbent material 70a is that such structures can have the rigidity and durability of conventional sorbent structures, while also having a high surface area suitable for $CO_2$ gas adsorption. Further, a continuous body 14a can be fabricated from inorganic, non-carbon sorbent materials that are particularly resistant to solvents and other volatiles in the exhaust streams comprising $CO_2$ gas. In addition, the continuous body 14a can be fabricated using standard extrusion processes employed in fabricating other types of filters (e.g., catalytic converters) that employ similar sorbent materials with little adjustment to manufacturing systems and infrastructure, thereby reducing overall manufacturing costs.

Referring again to the sorbent structure 10a depicted in FIGS. 1, 1A and 1B, the sorbent material 70a of the continuous body 14a can be fabricated from various sorbent materials that include, but are not limited to, zeolites, metal-organic framework ("MOFs") and combinations of these materials. Typical MOFs are compounds that consist of metal ions that are coordinated to organic ligands to form one-, two-, or three-dimensional structures typically with high porosity and surface area. Typical zeolite materials suitable for the sorbent material 70a are ZSM-5, 4A and 13X zeolite powders, each comprising aluminosilicate materials. In addition, other suitable zeolite materials include, but are not limited to, ZSM-8, ZSM-11, ZSM-12, Hyper-Y, Ultra-stabilized Y, Beta, Mordenite, ALPO, SAPO, Erionite, and L-zeolite.

As also noted earlier, the sorbent structure 10a depicted in FIGS. 1, 1A and 1B includes a carbon 80a that is substantially dispersed within the continuous body 14a and sorbent material 70a. In some embodiments, the carbon 80a is in a particulate form. In other embodiments, the carbon 80a is in the form of fibers, whiskers, or other discontinuous forms dispersed throughout the continuous body 14a comprising sorbent material 70a. The carbon 80a can be an activated carbon in some aspects of the sorbent structure 10a. In other preferred aspects of the sorbent structure 10a, the carbon 80a is in a non-activated form and may optionally include carbon black. When the carbon 80a is in a non-activated form, the manufacturing costs associated with the sorbent structure 10a are advantageously lower than a sorbent structure 10a with a carbon 80a configured in an activated form. This is because the processing temperatures for a non-activated form of the carbon 80a are lower than an activated form of the carbon 80a. In addition, the lower processing temperatures associated with a sorbent structure 10a as containing a non-activated form of carbon 80a allows for the use of less temperature-sensitive sorbent materials 70a, some of which possess increased $CO_2$ adsorption efficacy over higher temperature-capable sorbent materials.

In certain aspects of the sorbent structure 10a, the carbon 80a is derived from a synthetic precursor, an organic carbon precursor or combinations of synthetic and organic precursors. Examples of carbon precursors include synthetic carbon-containing polymeric materials. In one embodiment, the batch composition employed in making the sorbent structure 10a comprises an organic resin as a carbon precursor. Exemplary organic resins include thermosetting resins and thermoplastic resins (e.g., polyvinylidene chloride, polyvinyl chloride, polyvinyl alcohol, combinations thereof, and the like). Synthetic polymer materials may also be used, such as phenolic resins or a furfural alcohol-based resin such as a furan resin. Exemplary suitable phenolic resins are resole resins such as polyphenol resins. An exemplary suitable furan liquid resin is Furcab-LP from QO Chemicals Inc., Indiana. An exemplary suitable solid resin is a solid phenolic resin, e.g., a novolac resin. Referring again to the sorbent structure 10a depicted in FIGS. 1, 1A and 1B, the continuous body 14a can include sorbent material 70a and carbon material. In embodiments, continuous body 14 includes from about 5% to about 40% carbon, e.g., carbon 80a, by weight. In embodiments, the carbon is substantially dispersed within the body 14a. In other implementations, the continuous body 14a includes sorbent material 70a and about 10% to about 25% carbon by weight. Further, the continuous body can include carbon 80a at about 5%, 10%, 15%, 20%, 25%, 30%, 35%, 40% or more by weight and all carbon levels between these amounts. Still further, other implementations of the continuous body 14a can include carbon black in addition to the carbon 80a. The carbon lack levels employed in the continuous body 14a, in some aspects, range from about 1% to about 10% by weight. Accordingly, carbon levels may be about 1%, 2%, 3%, 4%, 5%, 6%, 7%, 8%, 9%, 10% and all carbon black levels between these amounts. In some implementations, the total amount of carbon 80a in the sorbent structure 10a may be from 2% to 40% by weight, preferably 10% to 20% by weight. These levels of carbon 80a help achieve an optimal balance of strength, adsorption capacity and electrical conductivity for resistive heating during a desorption cycle. The addition of a small percentage (e.g., from −1 to −5%) of carbon black to a carbon precursor will advantageously ensure that the carbon 80a has acceptable electrical conductivity and lower carbonization temperatures.

According to some embodiments of the sorbent structure 10a depicted in FIGS. 1, 1A and 1B, the continuous body 14a is derived from a green body that comprises a sorbent material 70a and a carbon 80a. Further, the green body can comprise inert inorganic fillers. Upon processing of the continuous body 14a (e.g., drying, curing and firing), these inorganic fillers remain in the continuous body 14a. More particularly, these inorganic fillers can include oxide-containing glasses, ceramics, glass-ceramics, and other refractory materials. Exemplary inorganic fillers that can be used include oxide-containing or oxygen-containing minerals or salts thereof, such as clays, talc, etc.; carbonates, such as calcium carbonate; aluminosilicates such as kaolin (i.e., an aluminosilicate clay), flyash (i.e., an aluminosilicate ash obtained after coal firing in power plants); silicates, e.g., wollastonite (i.e., calcium metasilicate); titanates; zirconates; zirconia; zirconia spinel; magnesium aluminum silicates; mullite; alumina; alumina trihydrate; boehmite; spinel; feldspar; attapulgites; aluminosilicate fibers; cordierite; and silica.

Still further, in some implementations, the continuous body 14a is derived from a green body that includes one or more pore formers. As used herein, "pore formers" are organic materials that may be burned off during firing, carbonization and/or activation heat treatments to leave porosity behind in the continuous body 14a. Example pore formers that can be used in the green body include polymeric beads, waxes, starch and natural or synthetic materials of various varieties as known in the art.

Referring again to the sorbent structure 10a depicted in FIGS. 1, 1A and 1B, the continuous body 14a can also be derived from a green body that includes an organic filler or fillers, in addition to the sorbent material 70a and the carbon 80a (e.g., in the form of a carbon precursor). Exemplary organic binders include cellulose compounds. Cellulose compounds include cellulose ethers, such as methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. An example methylcellulose binder is a METHOCEL™ A series product, sold by the Dow® Chemical Company ("Dow®"). Example hydroxypropyl methylcellulose binders include METHOCEL™ E, F, J, K series products, also sold by Dow®. Binders in the METHOCEL™ 310 Series products, also sold by Dow®, can also be used in the context of the invention. Dow® METHOCEL™ A4M is an example binder for use with a RAM extruder. Dow® METHOCEL™ F240C is an example binder for use with a twin screw extruder.

Referring once again to the sorbent structure 10a depicted in FIGS. 1, 1A and 1B, the continuous body 14a can also be derived from a green body that includes one or more forming aids (also referred herein as a "plasticizer"), in addition to the sorbent material 70a and the carbon 80a (e.g., in the form of a carbon precursor). Exemplary forming aids include soaps, fatty acids, such as oleic, linoleic acid, sodium stearate, etc., polyoxyethylene stearate, etc., and combinations thereof. Other additives that can be useful for improving the extrusion and curing characteristics of the batch employed in fabricating the green body are phosphoric acid and oil. Exemplary oils include vegetable oils, petroleum oils with molecular weights from 250 to 1000, and other oils containing paraffinic, and/or aromatic, and/or alicyclic compounds. Some useful oils are 3-IN-ONE® oil from the WD-40 Company. Other useful oils can include synthetic oils based on poly alpha olefins, esters, polyalkylene glycols, polybutenes, silicones, polyphenyl ether, chlorotrifluoroethylene ("CTFE") oils, and other commercially available oils. Vegetable oils such as sunflower oil, sesame oil, peanut oil, soybean oil, etc., are also useful forming aid in the preparation of the green body that ultimately forms the continuous body 14a.

According to one implementation of the sorbent structure 10a depicted in FIGS. 1, 1A and 1B, the continuous body 14a is derived from a green body that includes a phenolic resin (e.g., as a precursor for the carbon 80a), a methylcellulose, a plasticizer, an inorganic filler and the sorbent material 70a. In certain aspects, the green body includes from about 25 to about 35% phenolic resin (by weight) as the precursor for the carbon 80a, from about 1% to about 5% plasticizer, from about 5% to about 15% alumina inorganic filler, from about 50% to about 65% zeolite as the sorbent material 70a and from about 4% to about 7% methylcellulose. According to another embodiment, the continuous body 14a is derived from a green body that additionally includes from about 1 to about 5% carbon black by weight, along with one or more carbon precursors as outlined in the disclosure, to improve electrical conductivity and reduce carbonization temperatures.

The sorbent structure 10a depicted in FIGS. 1, 1A and 1B, according to aspects of the disclosure, can also be characterized by a specific surface area as measured by a Brunauer-Emmett-Teller ("BET") method according to standard principles understood in the field of specific surface area measurement methodology. According to an embodiment, the sorbent structure 10a can be characterized by a specific surface area from about 50 $m^2$/g to about 1000 $m^2$/g. In some aspects, the specific surface area of the sorbent structure 10a is from about 100 $m^2$/g to about 600 $m^2$/g. In another aspect, the specific surface area of the sorbent structure 10a is from about 100 m²/g to about 200 m²/g. In a further aspect, the specific surface area of the sorbent structure 10a is from about 400 m²/g to about 600 m²/g.

As noted earlier, the temperature of the sorbent structure 10a depicted in FIGS. 1, 1A and 1B (and the sorbent structure 10b depicted in FIG. 1C) can be controlled by conduction of an electrical current through its continuous body 14a to effect ESA-related adsorption and desorption of $CO_2$ gas. The sides 12 of the sorbent structure 10a can be configured to be electrically conductive, and connected to leads 40 and an electrical power supply 48. Further, the sides 12 of the sorbent structure, which are configured to be conductive, are positioned so as to be able to conduct an electric current through the sorbent structure, preferably in a uniform fashion. The actual positioning of the sides 12 depends on the geometry of the device. Nevertheless, the sides 12 of the sorbent structure 10a (and the sorbent structure 10b shown in FIGS. 1, 1A and 1C) are not limited to any specific type of conductor or conductor geometry. Preferably, however, the current passing from the power supply 48 through the leads 40 generates a substantially uniform heating of the sorbent structure without a prevalence of hot spots.

The voltage and current requirements for the sorbent structure 10a depicted in FIGS. 1, 1A and 1B (and the sorbent structure 10b depicted in FIGS. 1, 1A and 1C) can vary depending on the application of the sorbent structure. Further, the resistivity of the sorbent structure can be adjusted as desired according to the following equation:

$$\rho = \frac{R \cdot A}{L}$$

where ρ is resistivity in ohm-cm, R is resistance in ohms, A is the area of the conducting surface in cm² and L, as noted earlier, is the distance between two conducting surfaces in cm.

According to an embodiment of the sorbent structure 10a depicted in FIGS. 1, 1A and 1B (and the sorbent structure 10b depicted in FIGS. 1, 1A and 1C), a conducting metal can be applied to each of the opposing sides 12 (or surfaces) of the sorbent structure and flow-through substrate 14. As referred to herein, "opposing sides" or "opposing surfaces" of the sorbent structure are such that the sides or surfaces are so spaced according to the geometry of the continuous body 14a (and the continuous body 14b depicted in FIGS. 1, 1A and 1C) such that passage of current between the conductive sides or surfaces produces a current that heats the continuous body in a substantially uniform fashion. Of course, the opposing surfaces may be at any location (including a multitude of locations) on or within the sorbent structure to enable substantially uniform heating of the continuous body with a current applied. Exemplary conducting materials that can be employed for the opposing sides 12 (or opposing surfaces as the case may be for a continuous body without parallel opposed sides 12) include metals and metal alloys that contain one or more of copper, silver, aluminum, zinc, nickel, lead, and tin. In embodiments, the sides 12 are coated with a silver-containing paint or paste due to its ease of application and high electrical conductivity. In addition, sorbent structures with conductive sides 12 can be configured such that the sides 12 are in the form of, or otherwise include, a strip of conducting material on the continuous body of the sorbent structure. If an electrode is employed to connect to the side 12 as part of the lead 40, for example, it can be applied by a pressure contact, e.g., a spring. Alternatively, in some aspects, a strip of conducting metal can be employed for this purpose and attached to the sorbent structure and continuous body by an electrically conductive adhesive, e.g., a silver-containing epoxy such as E-Solder® #3012 and #3022 from Von Roll USA, Inc. Further, in some embodiments, a copper coating can be deposited for this purpose by a spray metal coating approach as understood by those with ordinary skill in the field.

Without being bound by theory, the resistive heating of the sorbent structure 10a that includes the continuous body 14a by this ESA-related approach is driven largely by the presence of the carbon 80a, as substantially dispersed throughout the continuous body 14a and its sorbent material 70a. While the carbon 80a can itself be highly electrically conductive, its presence in a dispersed form throughout the continuous body 14a allows the resistive heating to be effected through the combination of the sorbent material 70a, which is less electrically conductive, and the carbon 80a, which is more electrically conductive. Further, the dispersal of the carbon 80a throughout the continuous body 14a and the sorbent material 70a ensures that temperature uniformity is achieved with no substantial prevalence of thermal hot spots.

Figure 1C:
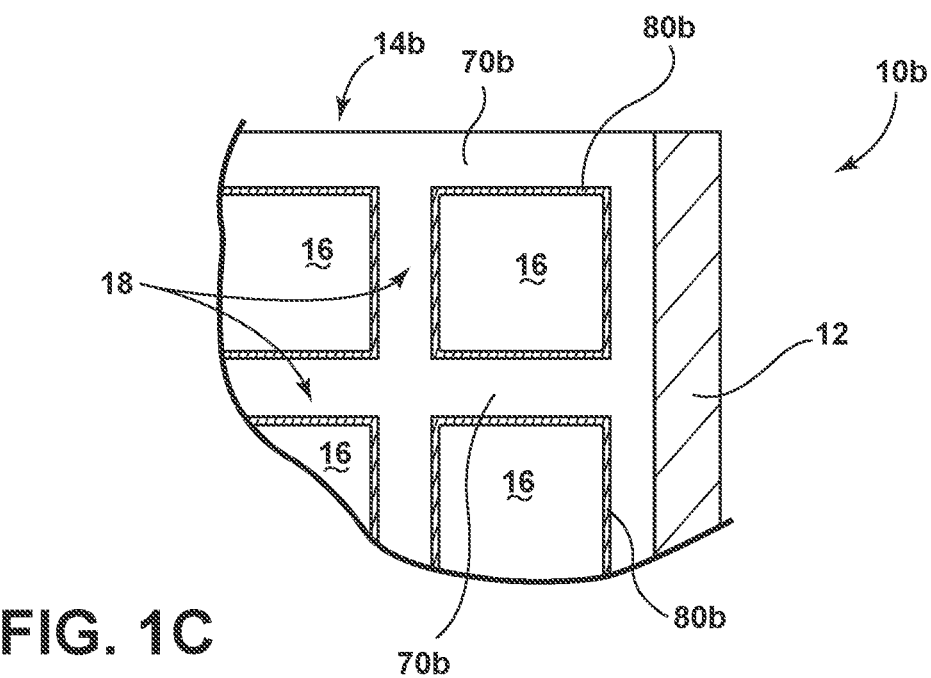
FIG. 1C is an enlarged, top-down, schematic view of a second embodiment of the sorbent structure depicted in FIG. 1.

Referring now to FIGS. 1, 1A and 1C, a sorbent structure 10b is depicted in schematic form within a $CO_2$ gas adsorption and regeneration system. In general, the sorbent structure 10b is fabricated with similar structures, and possesses the same function, as the sorbent structure 10a outlined earlier. Accordingly, like-numbered elements have the same or similar structures and functions. More particularly, the sorbent structure 10b includes a continuous body 14b in the form of a flow-through substrate 14. The continuous body 14b and the flow-through substrate 14 include a non-activated carbon 70b and at least one cell 16 defined by at least one porous wall 18. The continuous body 14b further includes a sorbent coating 80b comprising a sorbent material. In certain implementations, the sorbent coating 80b is on the porous walls 18. In other implementations, the sorbent coating 80b can be located within the continuous body 14b (not shown and optionally on the porous walls 18).

With further regard to the sorbent structure 10b depicted in FIGS. 1, 1A and 1C, the continuous body 14b is continuous in a comparable sense as the continuous body 14a, as outlined earlier (see FIG. 1B). As used herein in connection with the sorbent structure 10b and the continuous body 14b, the term "continuous body" refers to a continuous uninterrupted structure of non-activated carbon material 70b and a sorbent coating 80b. Accordingly, a "continuous body" can be in the form of a network, skeleton or other interconnected structure in which the non-activated carbon material 70b is in contact throughout the structure 10b. In addition, the non-activated carbon material 70b of the sorbent structure 10b (see FIGS. 1, 1A and 1C) has the same or similar structure and processing as the carbon 80a employed in the sorbent structure 10a (see FIG. 1B). Further, the sorbent coating 80b is essentially dispersed within the non-activated carbon material 70b and/or coated on its porous walls 18. In addition, the sorbent material of the sorbent coating 80b employed in the sorbent structure 10b (see FIGS. 1, 1A and 1C) has the same or similar structure and processing as the sorbent material 70a employed in the sorbent structure 10a (see FIG. 1B).

An advantage of the sorbent structure 10b, as shown in FIGS. 1, 1A and 1C, with a continuous body 14b that includes a continuous uninterrupted structure of non-activated carbon material 70b is that such structures can have the rigidity and durability of conventional sorbent structures, while also having a high surface area suitable for $CO_2$ gas adsorption. While a continuous uninterrupted body of activated carbon might have a higher surface area in direct comparison to a continuous body that comprises a non-activated carbon, the continuous body 14b that combines both an uninterrupted structure of non-activated carbon 70b and a sorbent coating 80b comprising sorbent material can possess the same or higher surface areas and the same or better $CO_2$ gas adsorption and desorption efficacy. As noted earlier, the manufacturing costs of the sorbent structure 10b with a continuous body 14b that comprises a non-activated carbon are significantly lower than a comparable system that relies on activated carbon. Further, the lower processing temperatures associated with the sorbent structure 10b allow it to employ a sorbent coating 80b with more temperature-sensitive sorbent materials having advantageously high surface areas and $CO_2$ gas adsorption efficacy.

According to an embodiment of the sorbent structure 10b, the continuous body 14b includes a sorbent coating 80b that is derived from a green coating that comprises the sorbent material and at least one of a methylcellulose, a plasticizer, or an inorganic filler. As noted earlier, the sorbent material employed in the sorbent coating 80b can be configured comparably to the sorbent material 70a of the sorbent structure 10a outlined earlier. In certain aspects, the green coating is applied as a wash-coating to the continuous body 14b of the sorbent structure 10b.

According to other implementations, the sorbent structure 10b has a specific surface area from about 400 $m^2/g$ to about 600 $m^2/g$ as measured by a BET adsorption method. Other implementations are such that the sorbent structure 10b has a specific surface area from about 100 $m^2/g$ to about 200 $m^2/g$, again as measured by a BET adsorption method.

In addition, the temperature of the sorbent structure 10b depicted in FIGS. 1, 1A and 1C, can be controlled by conduction of an electrical current through the body 14b. Depending on the arrangement of the sorbent structure 10b, sides 12, leads 40, power supply 48 (see FIG. 1), and other factors, the electrical resistance of the sorbent structure 10b and its continuous body 14b can be from about 5 to about 15 ohms. Without being bound by theory, the resistive heating of the sorbent structure 10b with a continuous body 14b by an ESA-related approach, as outlined earlier, is driven largely by the continuous body 14b, as comprising a non-activated carbon 70b. While the non-activated carbon 70b can itself be highly electrically conductive, its presence throughout the continuous body 14b in combination with the sorbent coating 80b, which is less conductive, allows the resistive heating to be effected through the combination of the non-activated carbon material 70b and the sorbent coating 80b. Further, the coverage of the sorbent coating 80b throughout the continuous body 14b and/or on the porous walls 18 of the body 14b helps ensure that temperature uniformity is achieved with no substantial prevalence of thermal hot spots and, accordingly, uniform desorption of adsorbed gases passing throughout the body 14b.

As noted earlier, the sorbent structures 10a, 10b depicted in FIGS. 1-1C can be employed to adsorb and desorb $CO_2$ gas through an ESA-related process that employs resistive heating. In some embodiments, the sorbent structure 10a, 10b can remove at least 50% of the $CO_2$ gas from the exhaust stream in which the sorbent structure has been situated for this purpose. In other aspects, the sorbent structure 10a, 10b can remove at least 70% of the $CO_2$ gas from the exhaust stream with an ESA-related process. In addition, some implementations of the sorbent structure 10a, 10b can remove at least 90% of the $CO_2$ gas from the exhaust stream through an ESA-related process.

It should also be appreciated that a sufficient temperature to desorb the $CO_2$ gas with the sorbent structures 10a, 10b will depend, in part, on the amount of $CO_2$ gas that is present. In one embodiment, a sufficient temperature can comprise heating the sorbent structures 10a, 10b with an ESA-related process at a temperature in the range of from about 50° C. to about 300° C., including, for example, temperatures of 100° C., 150° C., 180° C. or 200° C., including all ranges and subranges therebetween. In another embodiment, the sufficient heating temperature can be in the range derived from these values, including for example, a range from about 90° C. to about 200° C., or about 90° C. to about 180° C.

Once at least a portion of the desorbed $CO_2$ gas has been chemically and/or physically desorbed from the sorbent structures 10a, 10b, the desorbed $CO_2$ gas can be separated from the sorbent structure by a waste stream. In one embodiment, a suitable waste stream for conveying the desorbed $CO_2$ gas can comprise a flow of inert gas, such as nitrogen. Still further, the waste stream containing at least a portion of the desorbed $CO_2$ gas can, if desired, be conveyed to a $CO_2$ gas collection device for subsequent remediation or collection of the desorbed $CO_2$ gas. Any $CO_2$ gas desorbed from the sorbent structures 10a, 10b can be recovered in a secondary system for later containment through other storage mechanisms or processes.

In addition, any sorbent structures 10a, 10b, and other sorbent structures consistent with the principles of these structures, such as those having flow-through substrates 14 in the form of a honeycomb, may be incorporated into or used in any appropriate system environments. For example, the sorbent structures of the disclosure can be employed in a process stream of a coal-fired plant or natural gas combined cycle power plant. The sorbent structures 10a, 10b can also be placed after particulate matter control and before the stack. If an $SO_2$ gas control system is in place, the sorbent structure 10a, 10b can be placed after the $SO_2$ gas control system. More generally, any one of the above-mentioned sorbent structures 10a, 10b, and like-constructed sorbent structures, can be incorporated into a system configuration for $CO_2$ gas removal and sorbent regeneration.

According to another aspect of the disclosure, a method of making a sorbent structure, such as the sorbent structure 10a depicted in FIGS. 1, 1A and 1B, is provided. The method includes; forming a mixture of a carbon precursor and a sorbent material (e.g., sorbent material 70a) into the shape of a flow-through substrate (e.g., flow-through substrate 14); drying the mixture, e.g., to remove volatiles and moisture; and carbonizing the carbon precursor in the mixture to define a continuous body (e.g., continuous body 14a) in the form of the flow-through substrate comprised of at least one cell (e.g., cell 16) defined by at least one porous wall (e.g., porous wall 18). Further, and as noted earlier, the continuous body 14a comprises a sorbent material 70a and a carbon 80a, the carbon 80a substantially dispersed within the continuous body 14a. For example, the carbon 80a may be included in the body 14a at about 5% to about 40% carbon by weight. In another implementation, the carbon 80a may be included in the body 14a at about 10% to about 25% carbon by weight. In addition, the temperature of the sorbent structure 10a, as fabricated by this method, can be controlled by conduction of an electrical current through the body 14a.

According to the method, the step of forming the mixture of a carbon precursor and a sorbent material into the shape of a flow-through substrate (e.g., flow-through substrate 14) can be conducted according to various approaches. For example, the mixture can be formed into a shape, for example, a honeycomb, by any appropriate technique, such as by extrusion. Extrusion of the carbon precursor and sorbent material can be conducted by using standard extruders and extrusion equipment (e.g., a ram extruder, a single-screw extruder, a double-screw extruder, and others), along with custom dies to make flow-through substrates of various shapes and geometries. As noted earlier, the presence of forming aids and plasticizers in the mixture can aid in the forming step.

A further step in the foregoing method of making a sorbent structure, such as the sorbent structure 10a, is to dry or otherwise cure the mixture that results from the forming step. For example, the mixture of the carbon precursor and the sorbent material can be heated in an oven at about 100° C. to about 200° C. for a few minutes to a few hours in ambient or an inert atmosphere to dry the mixture. To the extent that the mixture includes one or more organic resins, the mixture can be cured by heating the mixture in air at atmospheric pressures and typically by heating the mixture at a temperature from about 70° C. to about 200° C. for about 0.5 hours to about 5.0 hours. In certain embodiments of the method, the mixture is heated from a low temperature to a higher temperature in stages, for example, from about 70° C., to about 90° C., to about 125° C., to about 150° C., each temperature being held for a few minutes to hours. Additionally, curing can also be accomplished by adding a curing additive such as an acid additive at room temperature, an ultraviolet (UV)-sensitive catalyst and applying UV light, and others.

After the drying and/or curing step, the method includes a step of carbonizing the carbon precursor in the mixture to define a continuous body (e.g., continuous body 14a) in the form of a flow-through substrate comprised of at least one cell (e.g., cell 16) defined by at least one porous wall (e.g., porous wall 18). For instance, the carbon precursor in the mixture may be carbonized by subjecting it to an elevated carbonizing temperature in an $O_2$-depleted atmosphere. The carbonization temperature can range from about 600° C. to about 1200° C. and, in certain embodiments, it can range from about 700° C. to about 1000° C. Further, the carbonizing atmosphere can be inert, primarily comprising a non-reactive gas such as $N_2$, Ne, Ar, and mixtures thereof. At the carbonizing temperature in an $O_2$-depleted atmosphere, organic substances contained in the mixture can decompose to leave a carbonaceous residue with a high surface area. In some embodiments of the method, the forming, drying and carbonizing steps are conducted such that the sorbent material (e.g., sorbent material 70a) is continuous within the continuous body (e.g., continuous body 14a).

According to another implementation of the method of making a sorbent structure, such as the sorbent structure 10a depicted in FIGS. 1, 1A and 1B, the method includes a step of activating the carbon in the continuous body (e.g., continuous body 14a). Typically, the activating step would be conducted after the carbonizing step. In particular, the carbon in the continuous body can be subjected to a gaseous atmosphere selected from $CO_2$, $H_2O$, a mixture of $CO_2$ and $H_2O$, a mixture of $CO_2$ and nitrogen, a mixture of $H_2O$ and nitrogen, and a mixture of $CO_2$ and another inert gas, for example, at an elevated activating temperature in a $CO_2$ and/or $H_2O$-containing atmosphere. The atmosphere may be essentially pure $CO_2$ or $H_2O$ (steam), a mixture of $CO_2$ and $H_2O$, or a combination of $CO_2$ and/or $H_2O$ with an inert gas such as nitrogen and/or argon. A $CO_2$ and nitrogen mixture may be used, for example, with $CO_2$ content as low as 2% or more. Typically, a mixture of $CO_2$ and nitrogen with a $CO_2$ content of 5-50% (by weight) may be used to reduce process costs. The activating temperature can range from about 600° C. to about 1000° C. In other embodiments, the activating temperature can range from about 600° C. to about 900° C. During this step, part of the carbonaceous structure of the carbonized batch mixture body is mildly oxidized:

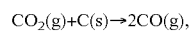

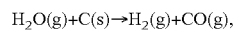

resulting in the etching of the structure of the carbon (e.g., in a carbonaceous from the prior carbonizing step) in the continuous body and formation of activated carbon, as substantially dispersed throughout the continuous body. Further, the activated carbon can include a plurality of pores on either or both of a nanoscale and a microscale.

According to a further aspect of the disclosure, a method of making a sorbent structure, such as the sorbent structure 10b depicted in FIGS. 1, 1A and 1C, is provided. The method includes; forming a carbon precursor into the shape of a flow-through substrate (e.g., flow-through substrate 14); and carbonizing the carbon precursor in the mixture to form a continuous body (e.g., continuous body 14b) comprising a non-activated carbon (e.g., non-activated carbon 70b) define a continuous body (e.g., continuous body 14a) in the form of the flow-through substrate comprised of at least one cell (e.g., cell 16) defined by at least one porous wall (e.g., porous wall 18). Further, the method includes a step of applying a sorbent coating (e.g., sorbent coating 80b) comprising a sorbent material (e.g., as comparable to the sorbent material 70a described in connection with the sorbent structure 10a) into the flow-through substrate. In addition, the method includes firing the sorbent coating within the flow-through substrate. Further, and as noted earlier, the temperature of the sorbent structure (e.g., sorbent structure 10b), as fabricated by this method, can be controlled by conduction of an electrical current through the body (e.g., continuous body 14b).

In general, the forming and carbonizing steps of the foregoing method for making a sorbent structure, such as sorbent structure 10b, can be conducted according to the same steps outlined earlier in connection with the method of making a sorbent structure, such as sorbent structure 10a. As for the step of applying the sorbent coating (e.g., sorbent coating 80b), various techniques are suitable. Exemplary approaches for the applying step include wash-coating, immersion, dip-coating and others. Finally, the step of firing the sorbent coating can be conducted according to the same time, temperature and atmospheres employed in the carbonizing and/or activating steps outlined earlier in connection with the method of making a sorbent structure, such as sorbent structure 10a.

EXAMPLES

The following examples represent certain non-limiting embodiments of the disclosure.

Example 1: Resistive Heating and ESA Capability of a Zeolite/Carbon Sorbent Structure As shown schematically in FIG. 2, a sorbent structure heating arrangement 100, including a sorbent structure 10a (see also FIGS. 1, 1A and 1B), was prepared as follows. In a one gallon Nalgene® bottle, 664.3 g of ZSM-5 zeolite from Zeolyst Co. (CBV3024E); 66.54 g of cellulose fiber from Akrochem Corp. (BH200); 67.20 g of hydroxypropyl methylcellulose A4M; and 12 g of sodium stearate were weighed and mixed with a turbula mixer for about 20 minutes. The mixed powder was emptied into a muller and mixing was continued for about 20 to 30 minutes while additional liquid components were added to the mixture: 360 g of phenolic resin liquid from Georgia-Pacific Chemicals (GP-510D50), 30 g of vegetable oil #2; and 120 g of deionized water. The resulting mix had good plasticity and was extruded with a honeycomb die, resulting in a green body with about 400 cells per square inch (cpsi) and a 0.007 inch wall thickness. Extruded honeycomb structure green bodies of 12 inches in length were cut, wrapped in aluminum foil (with open ends) and dried in an oven at 95° c. for 24 hours. Dried samples were then cut and carbonized in flowing nitrogen at 800° C. for 6 hours. These carbonized samples, indicative of sorbent structures 10a, were verified to be electrically conductive with a BET surface area of about 520 m$^2$/g.

The resulting sorbent structure 10a prepared according to Example 1 was in the form of a honeycomb-shaped flow-through substrate, comprising a continuous body of zeolite sorbent material and carbon with a length, l, of about 3 inches and a weight of 12.63 g. The carbon was substantially dispersed within the continuous body. Further, a silver paint was applied via a brush coating to sides of the flow-through substrate (e.g., sides 12 of the sorbent structure 10a) to improve electrical connectivity between electrical leads 40 and a power supply 48. Once the leads 40 were attached with silver paint to the sides of the flow-through substrate, the assembly was dried in an oven above 120° C. A stable electrical resistivity was measured between the leads 40, showing about 29.3 ohms across the cells of the flow-through substrate. At this point, electrical leads 40 were connected to a power supply 48 (e.g., a voltage regulator) to assess the resistive heating behavior of the sorbent structure. Further, thermocouples 101, 102 and 103 were inserted into the flow-through substrate of the sorbent structure 10a as shown in FIG. 2 to monitor heating of the structure as a function of time.

Figure 2:
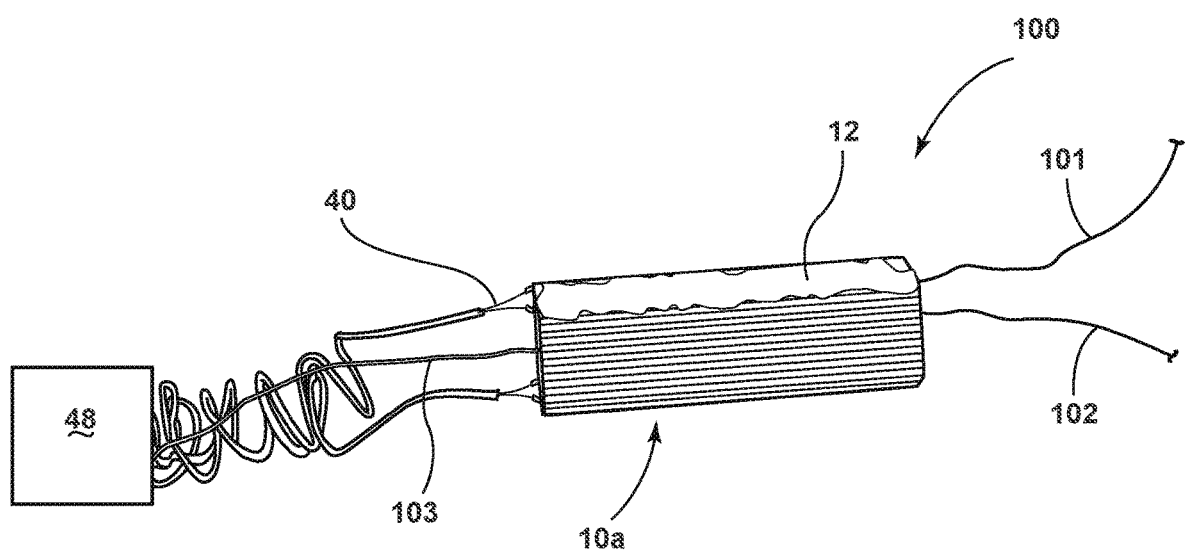
FIG. 2 is a perspective, schematic view of an arrangement to test the resistive heating capability of a sorbent structure comparable to the structure depicted in FIGS. 1 and 1B.
Figure 2A:
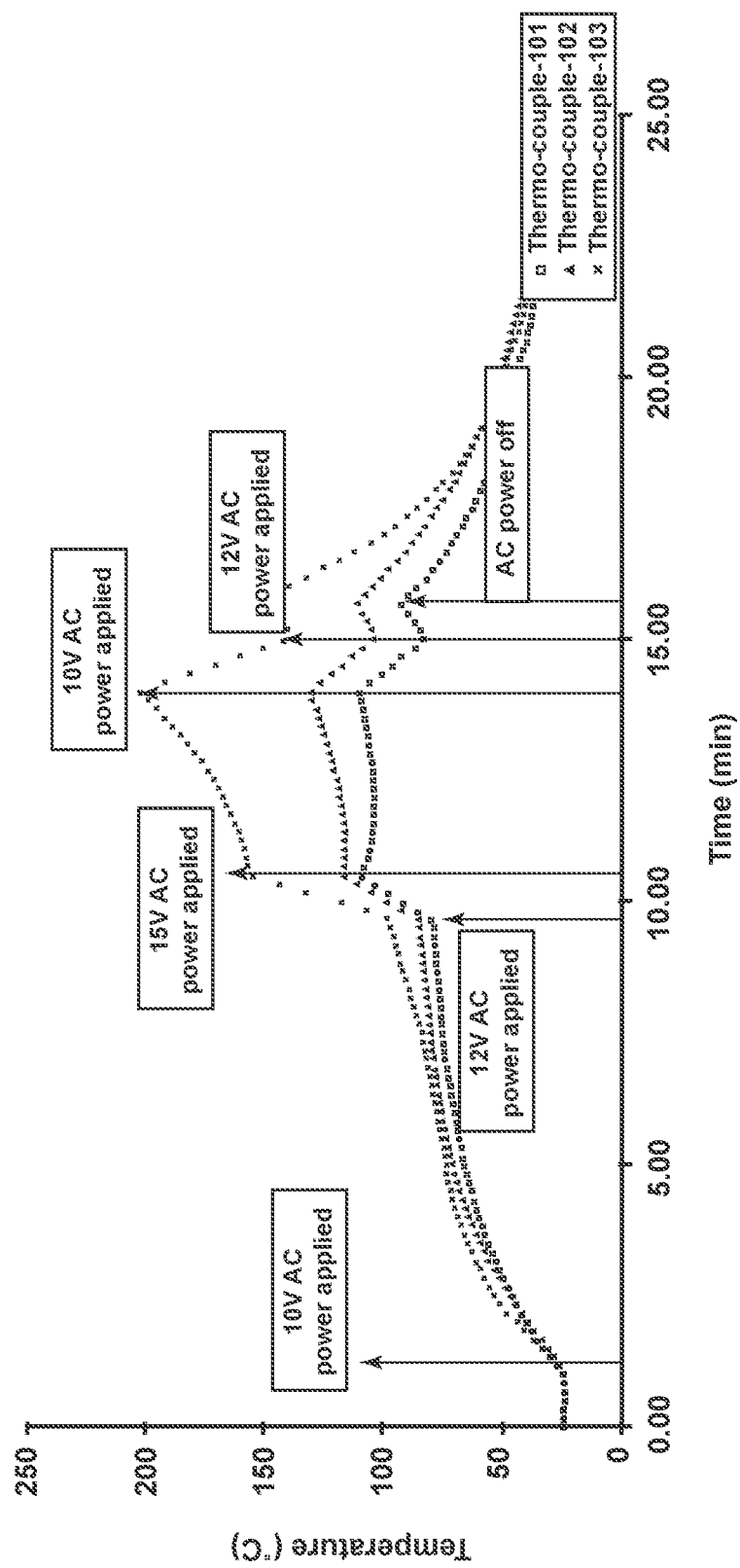
FIG. 2A is a plot of temperature and time data generated from the arrangement depicted in FIG. 2 as subjected to various AC voltages between 10V and 15V.

As shown in FIGS. 2 and 2A, the sorbent structure 10a was subjected to various voltage levels by the heating arrangement 100 as a function of time. In particular, the voltage applied to the sorbent structure 10a was varied between 10V AC, 12V AC, and 15V AC by the power supply 48 through the leads 40. As is evident from the data from the thermocouples 101, 102 and 103 shown in FIG. 2A, the temperature of the sorbent structure 10a was raised as a function of applied voltage from ambient temperature to a peak of about 200° C. After the AC voltage was removed, the temperature of the sorbent structure 10a eventually receded back to ambient temperature.

Figure 3:
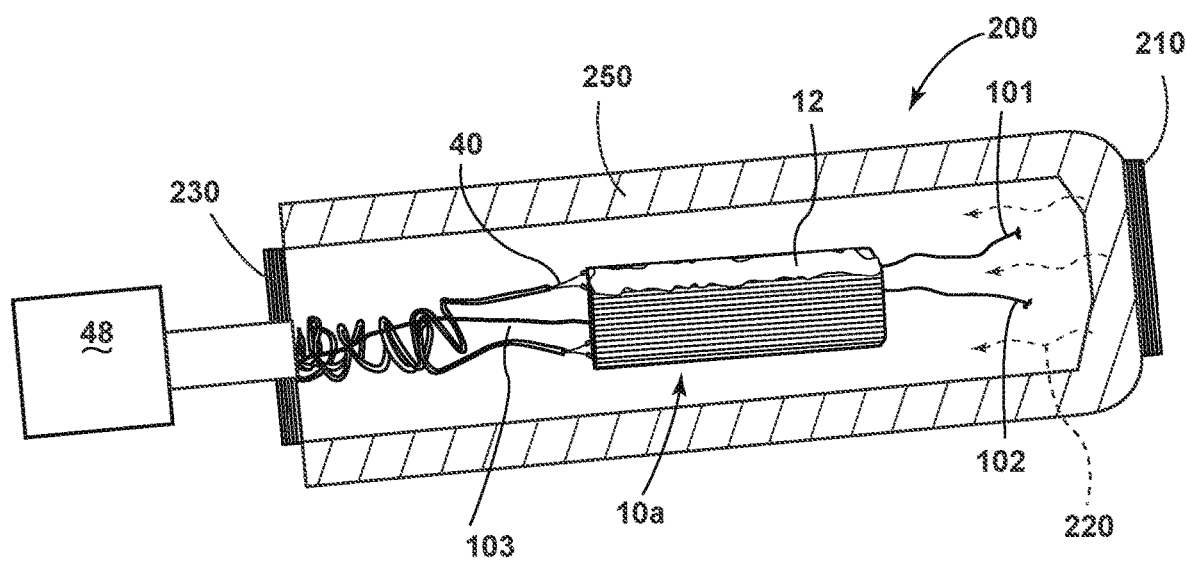
FIG. 3 is a perspective, schematic view of an arrangement to test the $CO_2$ adsorption and desorption capability of a sorbent structure comparable to the structure depicted in FIGS. 1 and 1B, as subjected to resistive heating.

Referring now to FIG. 3, the sorbent structure heating arrangement 100 (i.e., as depicted in FIG. 2) was placed into a $CO_2$ gas adsorption/desorption bench reactor testing arrangement 200. At the inlet end 210 of the reactor 250, a process gas 220 comprising about 10% $CO_2$ gas and a balance of $N_2$ gas was piped at a flow rate of 500 ml/min through the sorbent structure heating arrangement 100 (with the sorbent structure 10a contained therein) to simulate the adsorption stage of an ESA process to remove $CO_2$ gas using the sorbent structure 10a. During a subsequent simulation of the desorption stage of the ESA process, pure $N_2$ gas piped through the arrangement 100. As the respective process gases were piped through the heating arrangement 100, a Fourier Transform Infrared (FTIR) detector 230 was employed to monitor the $CO_2$ gas concentration (%) as a function of time.

Figure 3A:
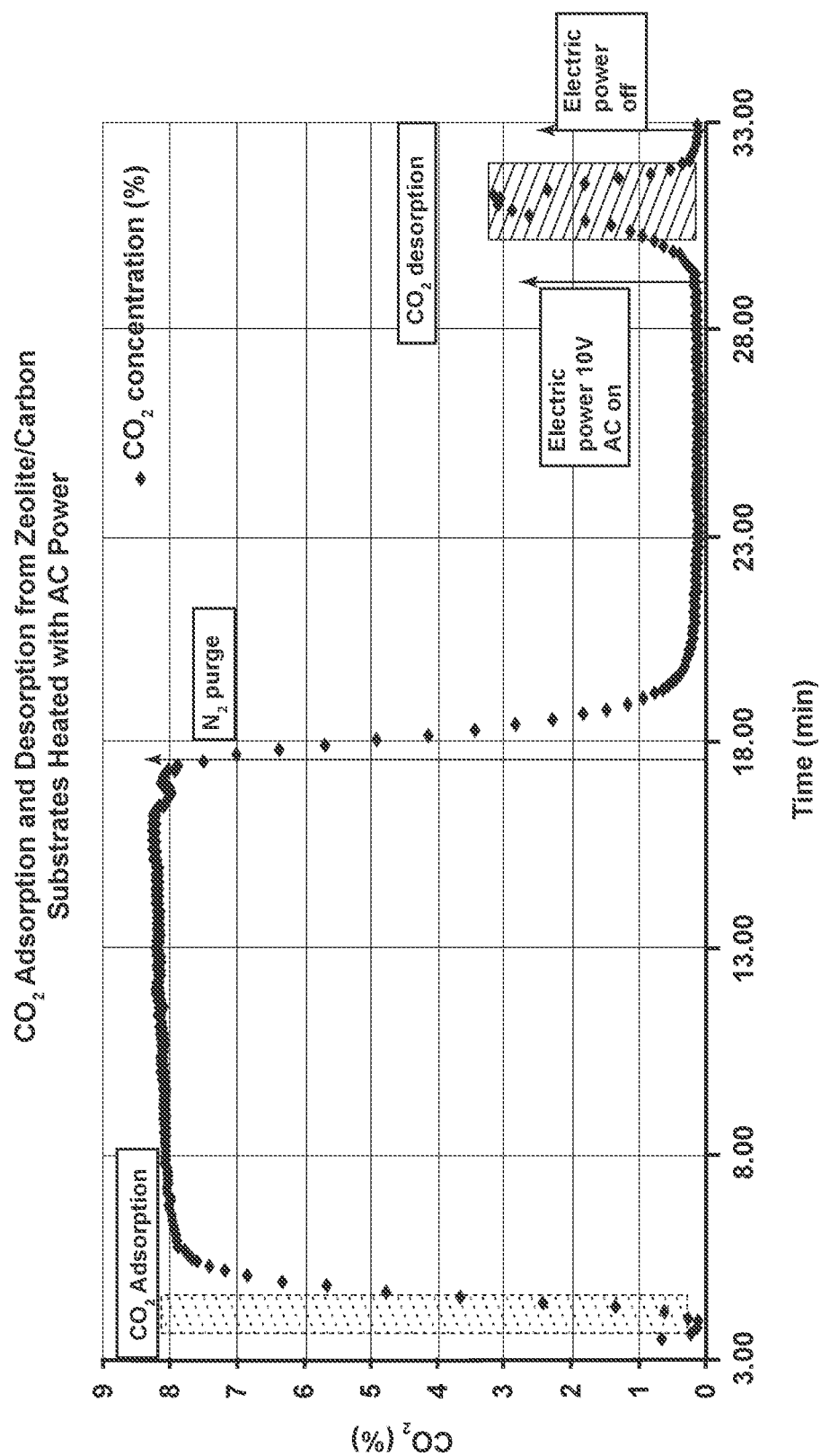
FIG. 3A is a plot of $CO_2$ concentration and time data generated from the arrangement depicted in FIG. 3 as subjected to resistive heating from a 10V AC voltage.

As shown in FIGS. 3 and 3A, the adsorption stage of the ESA process was simulated with the sorbent structure heating arrangement 100 by flowing process gas 220 through the sorbent structure 10a. In particular, the $CO_2$ concentration levels in the sorbent increased within about 5 to 8 minutes to a saturation level of about 8%. After about 16 or 17 minutes, the process gas 220 was switched to pure $N_2$ gas to simulate the desorption stage of the ESA process. In FIG. 3A, the switch in process gas 220 to pure $N_2$ gas is indicated by the drop in $CO_2$ levels to less than 1%. After about 10 minutes of purging with $N_2$ gas the heating arrangement 100 and the sorbent structure 10a with the pure $N_2$ gas, the sorbent structure 10a was heated by 10V AC applied from the power supply 48 through the leads 40 to desorb the $CO_2$ gas. As is evident from FIG. 3A, the $CO_2$ level spiked upward to about 3.2%, indicative of $CO_2$ gas desorption from the sorbent structure 10a associated with the resistive heating.

Example 2

Four sorbent structure compositions were prepared and fabricated consistent with the sorbent structure 10a, and the methods for making such sorbent structures, as outlined in the disclosure. These resulting sorbent structures were designated AOC170, AOD170, AOG170 and AOJ170, as listed below in Table 1. More particularly, the compositions listed below in Table 1 were prepared as a mixture in slurry form. The slurry was then extruded into a flow-through substrate in the form of a 1" diameter, 200 cpsi honeycomb with cell walls having a thickness of about 0.010" and geometric surface area of about 19.12 cm$^2$/cm$^3$, wrapped in aluminum foil (with open ends), and then dried out about 95° C. for 24 hours. The green strength of these samples was deemed to be high due to the high level of cross-linking associated with the phenolic resin, at a level greater than 2000 psi. The resulting flow-through substrate was then subjected to a carbonizing step at the particular temperature shown below in Table 1 (i.e., at 800° C., 600° C. or 500° C.). At this point, the final samples, as exemplary of sorbent structures 10a, were subjected to specific surface area measurements using multi-point and single point BET methods, as understood by those with ordinary skill in the specific surface area measurement field.

As is noted below in Table 1, the AOC170 and AOD170 samples containing ZSM-5 zeolite demonstrated a specific surface area exceeding 480 m$^2$/g. With regard to the AOJ170 and AOG170 compositions employing 13X and 4A zeolites, Table 1 demonstrates that the surface area of these compositions, which ranged from about 130 to about 185 m$^2$/g, can be sensitive to the carbonization temperature. In particular, higher carbonization temperatures for these zeolite compositions tended to reduce their crystallinity, which reduced the resulting specific surface area of the samples. It is expected, however, that carbon black (e.g., about 1 to 5% by weight) can be substituted for an equal amount of phenolic resin by weight in the AOG170 and AOJ170 compositions. As these compositions will have a significantly lower amount of carbon to convert via carbonization, a lower carbonization temperature can be employed for them. In view of the data in Table 1, a lower carbonization temperature should correlate to higher specific surface area levels.

TABLE 1

| Sample ID | AOC170 | AOD170 | AOG170 | AOJ170 |
|---|---|---|---|---|
| zeolite type | ZSM-5 | ZSM-5 | 13X | 4A |
| zeolite (wt. %) | 60.9 | 54.81 | 54.81 | 54.81 |
| $Al_2O_3$ filler (wt. %) | 0 | 10.15 | 10.15 | 10.15 |
| BH-200 cellulose (wt. %) | 6.1 | 6.1 | 6.1 | 6.1 |
| methylcellulose (wt. %) | 5.6 | 5.6 | 5.6 | 5.6 |
| sodium stearate (wt. %) | 1 | 1 | 1 | 1 |
| vegetable oil (wt. %) | 2.5 | 2.5 | 2.5 | 2.5 |
| phenolic resin (wt. %) | 30 | 30 | 30 | 30 |
| Multi-point BET ($m^2/g$)—800° C. carbonization | 523.5 | 450.2 | 132.9 | 135.3 |
| Single point BET ($m^2/g$)—800° C. carbonization | 519.8 | 447.1 | 131.7 | 134.4 |
| Multi-point BET ($m^2/g$)—600° C. carbonization | — | — | 153.9 | 154.5 |
| Single point BET ($m^2/g$)—600° C. carbonization | — | — | 152.3 | 153.4 |
| Multi-point BET ($m^2/g$)—500° C. carbonization | — | — | 182.5 | 154.4 |
| Single point BET ($m^2/g$)—500° C. carbonization | — | — | 180.1 | 153.2 |

Figure 4:
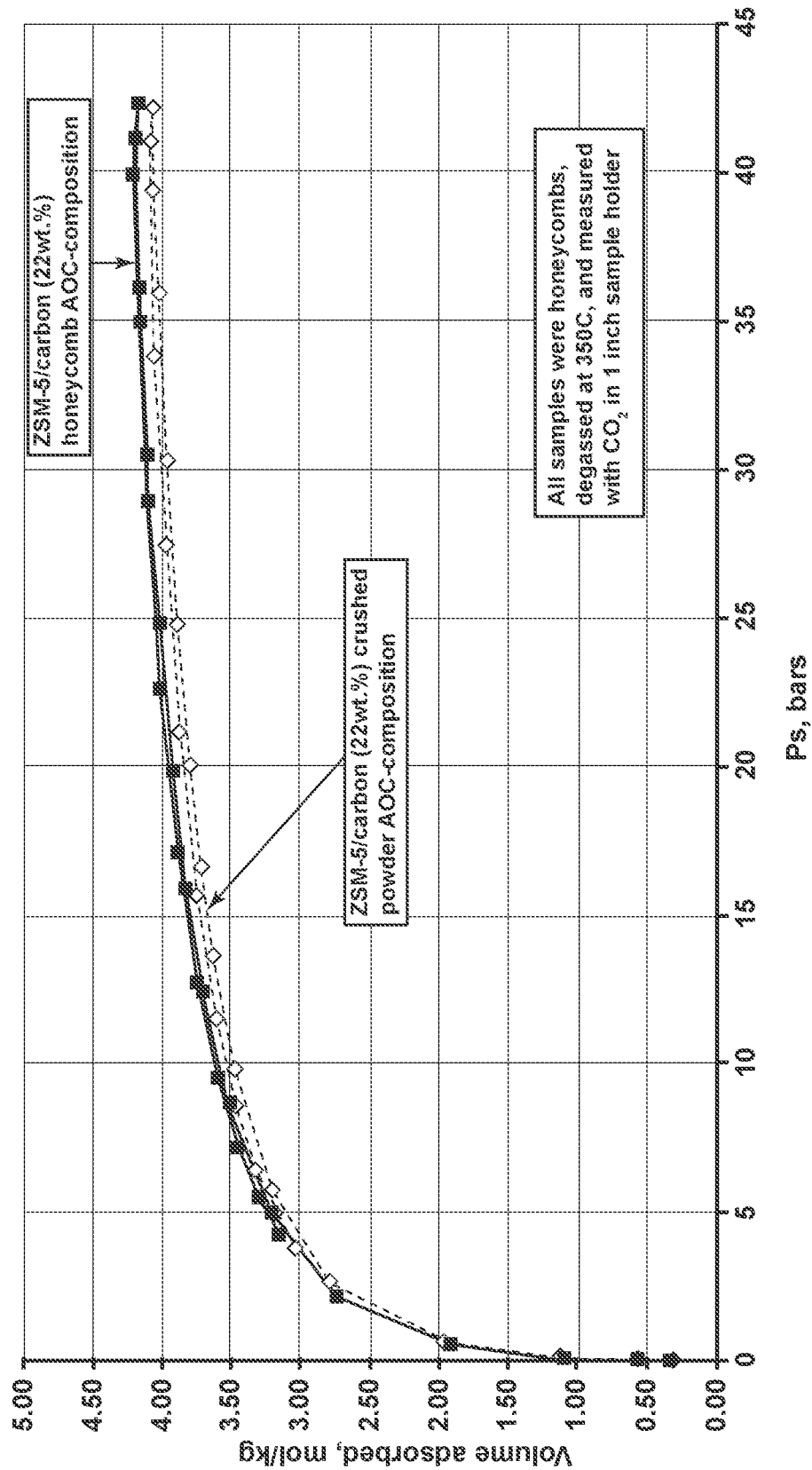
FIG. 4 is a $CO_2$ adsorption isotherm plot for a sorbent structure comparable to the structure depicted in FIGS. 1 and 1B.

Referring now to FIG. 4, a $CO_2$ adsorption isotherm plot is provided for the AOC170 composition (see Table 1). A Micromeritics® high pressure volumetric analyzer ("HPVA") system was employed with a 1" sample holder to measure the $CO_2$ volume adsorbed (mol/kg) as a function of pressure (bars) for two sets of AOC170 samples. Further, the samples were degassed at about 350° C. prior to the measurements with the HPVA system under $CO_2$ gas. The first sample measured was the sorbent structure with an AOC170 composition in a honeycomb, flow-through substrate form, as indicated by the series with solid squares. The second sample measured was a crushed powder version of the AOC170 sorbent structure composition. As is evident from the data, the isotherms for the AOC170 honeycomb sorbent structure and the AOC crushed powder samples were nearly identical. As such, the AOC honeycomb sorbent structure can adsorb $CO_2$ gas with an efficacy comparable to very high surface area powder with the same composition.

As outlined herein, a first aspect of disclosure pertains to a sorbent structure that includes a continuous body in the form of a flow-through substrate comprising at least one cell defined by at least one porous wall. The continuous body comprises a sorbent material and from about 5% to about 40% carbon by weight, the carbon substantially dispersed within the body. Further, the temperature of the sorbent structure can be controlled by conduction of an electrical current through the body.

According to a second aspect, the sorbent structure of aspect 1 is provided, wherein the body comprises from about 10% to about 25% carbon by weight.

According to a third aspect, the sorbent structure of aspect 1 or aspect 2 is provided, wherein the electrical resistance of the body is from about 5 ohms to about 15 ohms.

According to a fourth aspect, the sorbent structure of any of aspects 1-3 is provided, wherein the carbon is an activated carbon, a non-activated carbon, or combinations thereof.

According to a fifth aspect, the sorbent structure of any of aspects 1-3 is provided, wherein the carbon is a non-activated carbon.

According to a sixth aspect, the sorbent structure of any of aspects 1-5 is provided, wherein the sorbent material is continuous within the body.

According to a seventh aspect, the sorbent structure of any of aspects 1-6 is provided, wherein the sorbent material comprises a zeolite, a metal-organic framework, or combinations thereof.

According to an eighth aspect, the sorbent structure of any of aspects 1-7 is provided, wherein the carbon is derived from a synthetic carbon precursor, an organic carbon precursor or combinations thereof.

According to a ninth aspect, the sorbent structure of any of aspects 1-8 is provided, wherein the continuous body further comprises a carbon black.

According to a tenth aspect, the sorbent structure of any of aspects 1-9 is provided, wherein the continuous body is derived from a green body that comprises the carbon material, the sorbent material, and at least one of: a phenolic resin, a methylcellulose, a plasticizer, or an inorganic filler.

According to an eleventh aspect, the sorbent structure of any of aspects 1-10 is provided, wherein the sorbent structure has a specific surface area from about 400 $m^2/g$ to about 600 $m^2/g$ as measured by a Brunauer-Emmett-Teller (BET) adsorption method.

According to a twelfth aspect, the sorbent structure of any of aspects 1-10 is provided, wherein the sorbent structure has a specific surface area from about 100 $m^2/g$ to about 200 $m^2/g$ as measured by a Brunauer-Emmett-Teller (BET) adsorption method.

A thirteenth aspect of the disclosure pertains to a sorbent structure that includes a continuous body in the form of a flow-through substrate comprising a non-activated carbon and at least one cell defined by at least one porous wall; and a sorbent material as a coating on the continuous body. Further, the temperature of the sorbent structure can be controlled by conduction of an electrical current through the body.

According to a fourteenth aspect, the sorbent structure of aspect 13 is provided, wherein the electrical resistance of the body is from about 5 ohms to about 15 ohms.

According to a fifteenth aspect, the sorbent structure of aspect 13 or aspect 14 is provided, wherein the sorbent material comprises a zeolite, a metal-organic framework, or combinations thereof.

According to a sixteenth aspect, the sorbent structure of any of aspects 13-15 is provided, wherein the coating is derived from a green coating that comprises the sorbent material and at least one of: a methylcellulose, a plasticizer, or an inorganic filler.

A seventeenth aspect of the disclosure pertains to a method of making a sorbent structure that includes: forming a mixture of a carbon precursor and a sorbent material into the shape of a flow-through substrate; drying the substrate; and carbonizing the carbon precursor in the mixture to define a continuous body in the form of the flow-through substrate comprised of at least one cell defined by at least one porous wall. The body comprises a sorbent material and from about 5% to about 40% carbon by weight, the carbon substantially dispersed within the body. Further, the temperature of the sorbent structure can be controlled by conduction of an electrical current through the body.

According to an eighteenth aspect, the method of aspect 17 is provided, the method further comprising: activating the carbon in the continuous body, the activating conducted after the carbonizing step.

According to a nineteenth aspect, the method of aspect 17 or aspect 18 is provided, wherein the body comprises from about 10% to about 25% carbon by weight.

According to a twentieth aspect, the method of any of aspects 17-19 is provided, wherein the forming, drying and carbonizing steps are conducted such that the sorbent material is continuous within the body.

According to a twenty-first aspect, the method of any of aspects 17-20 is provided, wherein the sorbent material comprises a zeolite, a metal-organic framework, or combinations thereof.

According to a twenty-second aspect, the method of any of aspects 17-21 is provided, wherein the forming step comprises extruding the mixture into a green body of the shape of a flow-through substrate, the green body comprises the sorbent material and at least one of: a phenolic resin, a methylcellulose, a plasticizer, or an inorganic filler.

A twenty-third aspect of the disclosure pertains to a method of making a sorbent structure that includes: forming a carbon precursor into the shape of a flow-through substrate; carbonizing the carbon precursor to form a continuous, non-activated carbon body in the form of a flow-through substrate comprised of at least one cell defined by at least one porous wall; applying a sorbent material as a coating onto the substrate; and firing the coating. Further, the temperature of the sorbent structure can be controlled by conduction of an electrical current through the body.

According to a twenty-fourth aspect, the method of aspect 23 is provided, wherein the applying step comprises washcoating the sorbent coating into the substrate at a loading from about 100 g/L to about 300 g/L.

According to a twenty-fifth aspect, the method of aspect 23 or aspect 24 is provided, wherein the sorbent material comprises a zeolite, a metal-organic framework, or combinations thereof.

According to a twenty-sixth aspect, the method of any of aspects 23-25 is provided, wherein the coating is derived from a green coating that comprises the sorbent material and at least one of: a methylcellulose, a plasticizer, or an inorganic filler.

A twenty-seventh aspect of the disclosure pertains to a method of using a sorbent structure for $CO_2$ capture that includes: providing a sorbent structure according to aspect 1; and contacting the sorbent structure with a gas comprising $CO_2$. Further, the contacting is conducted to capture a portion of the $CO_2$ within the sorbent structure.

According to a twenty-eighth aspect, the method of aspect 27 is provided, wherein the gas is at a temperature of up to 80° C.

According to a twenty-ninth aspect, the method of aspect 27 or aspect 28 is provided, further comprising: applying a current to the sorbent structure to heat the sorbent structure such that the portion of the $CO_2$ within the sorbent structure is removed from the sorbent structure by desorption.

According to a thirtieth aspect, the method of any of aspects 27-29 is provided, wherein the applying a current is conducted to heat the sorbent structure to a temperature of 50° C. or above.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A sorbent structure, comprising:
   a continuous body of sorbent material that is inorganic and non-carbon, the continuous body configured in the form of a flow-through substrate comprising a plurality of cells defined by a plurality of intersecting porous walls, each of the cells forming a channel extending between opposite ends of the continuous body,
   the intersecting walls of the continuous body further comprise a carbon material such that the continuous body comprises from about 5% to about 40% by weight of the carbon material, and the carbon material is substantially dispersed within the sorbent material throughout the intersecting walls of the continuous body,
   wherein an electrical resistance between opposed sides or the opposite ends of the continuous body resistively heats the sorbent structure when electrical current is conducted therethrough such that the temperature of the sorbent structure can be controlled by adjusting the electrical current.

2. The sorbent structure of claim 1, wherein the continuous body comprises from about 10% to about 25% by weight of the carbon material.

3. The sorbent structure of claim 1, wherein the electrical resistance of the continuous body is from about 5 ohms to about 500 ohms between the opposed sides or the opposite ends.

4. The sorbent structure of claim 1, wherein the carbon material is an activated carbon, a non-activated carbon, or a combination thereof.

5. The sorbent structure of claim 1, wherein the carbon material is a non-activated carbon.

6. The sorbent structure of claim 1, wherein the continuous body has pores that define a total pore volume, and wherein from about 20% to about 70% of the total pore volume comprises pores having a pore diameter in a range of from about 2 nm to about 50 nm.

7. The sorbent structure of claim 6, wherein from about 20% to about 70% of the total pore volume comprises pores having a pore diameter in a range of from about 5 nm to about 20 nm.

8. The sorbent structure of claim 7, wherein the pores of the total pore volume establish interconnecting porosity throughout the continuous body.

9. The sorbent structure of claim 1, wherein the continuous body further comprises a carbon black.

10. The sorbent structure of claim 1, wherein the continuous body is derived from a green body that comprises the carbon material, the sorbent material, and at least one of: a phenolic resin, a methylcellulose, a plasticizer, or an inorganic filler.

11. The sorbent structure of claim 1, wherein the sorbent structure has a specific surface area from about 50 $m^2/g$ to about 1000 $m^2/g$ as measured by a Brunauer-Emmett-Teller (BET) adsorption method.

12. The sorbent structure of claim 1, wherein the sorbent material comprises a zeolite, a metal-organic framework, or combinations thereof.

13. The sorbent structure of claim 1, wherein the carbon material is derived from a synthetic carbon precursor, organic carbon precursor or combinations thereof.

14. A sorbent structure, comprising:
   a continuous body in the form of a flow-through substrate comprising a non-activated carbon and a plurality of cells defined by a plurality of intersecting porous walls, each of the cells forming a channel extending between opposite ends of the continuous body, and
   a sorbent material that is inorganic and non-carbon, the sorbent material configured as coatings on inner surfaces of the intersecting walls of the continuous body such that the coatings border the channels extending through the continuous body,
   wherein an electrical resistance between opposed sides or the opposite ends of the continuous body resistively heats the sorbent structure when electrical current is conducted therethrough such that the temperature of the sorbent structure can be controlled by adjusting the electrical current, and wherein the continuous body has pores that define a total pore volume, and wherein from about 20% to about 70% of the total pore volume comprises pores having a pore diameter in a range of from about 2 nm to about 50 nm.

15. The sorbent structure of claim 14, wherein the electrical resistance of the continuous body is from about 5 ohms to about 500 ohms between the opposed sides or the opposite ends.

16. The sorbent structure of claim 14, wherein the sorbent material comprises a zeolite, a metal-organic framework, or combinations thereof.

17. The sorbent structure of claim 14, wherein the coating is derived from a green coating that comprises the sorbent material and at least one of: a methylcellulose, a plasticizer, or an inorganic filler.

18. The sorbent structure of claim 14, wherein the sorbent structure has a specific surface area from about 50 $m^2/g$ to about 1000 $m^2/g$ as measured by a Brunauer-Emmett-Teller (BET) adsorption method.

19. The sorbent structure of claim 14, wherein the pores of the total pore volume establish interconnecting porosity throughout the continuous body.

20. The sorbent structure of claim 19, wherein at least some of the coatings of the sorbent material are disposed within the intersecting porous walls via the pores.

* * * * *